US008311197B2

(12) United States Patent
Shaffer et al.

(10) Patent No.: US 8,311,197 B2
(45) Date of Patent: Nov. 13, 2012

(54) METHOD AND SYSTEM FOR ALLOCATING, REVOKING AND TRANSFERRING RESOURCES IN A CONFERENCE SYSTEM

(75) Inventors: Shmuel Shaffer, Palo Alto, CA (US); Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1521 days.

(21) Appl. No.: 11/558,799

(22) Filed: Nov. 10, 2006

(65) Prior Publication Data
US 2008/0112337 A1 May 15, 2008

(51) Int. Cl.
*H04M 3/42* (2006.01)
(52) U.S. Cl. .................................. 379/202.01; 379/159
(58) Field of Classification Search ............ 379/202.01, 379/159, 201.01, 201.02, 201.03, 221.15, 379/265.01–265.14
See application file for complete search history.

(56) References Cited

U.S. PATENT DOCUMENTS

| | | | | |
|---|---|---|---|---|
| 6,438,111 | B1* | 8/2002 | Catanzaro et al. | 370/260 |
| 6,453,336 | B1* | 9/2002 | Beyda et al. | 709/204 |
| 6,744,741 | B1* | 6/2004 | Ju et al. | 370/260 |
| 7,466,810 | B1 | 12/2008 | Quon et al. | |
| 2005/0099492 | A1* | 5/2005 | Orr | 348/14.08 |
| 2005/0197877 | A1* | 9/2005 | Kalinoski | 705/8 |
| 2005/0237952 | A1* | 10/2005 | Punj et al. | 370/260 |
| 2006/0245379 | A1* | 11/2006 | Abuan et al. | 370/261 |
| 2006/0268683 | A1* | 11/2006 | Dhesikan et al. | 370/216 |
| 2006/0268824 | A1* | 11/2006 | Dhesikan et al. | 370/351 |
| 2007/0070891 | A1 | 3/2007 | Zheng | |
| 2007/0116225 | A1* | 5/2007 | Zhao et al. | 379/202.01 |
| 2007/0156903 | A1 | 7/2007 | Ardulov | |
| 2008/0112431 | A1 | 5/2008 | Jagadesan et al. | |
| 2008/0158337 | A1* | 7/2008 | Richardson | 348/14.09 |
| 2008/0211901 | A1* | 9/2008 | Civanlar et al. | 348/14.09 |
| 2009/0037585 | A1 | 2/2009 | Miloushev et al. | |
| 2009/0153645 | A1* | 6/2009 | Hagendorf | 348/14.08 |

* cited by examiner

*Primary Examiner* — William Deane, Jr.
(74) *Attorney, Agent, or Firm* — Schwegman, Lundberg & Woessner, P.A.

(57) ABSTRACT

A method of allocating, revoking and transferring resources from a pool of conference resources provided by a conference system comprises assigning a guaranteed status to at least some participants to a conference to be hosted by the system. At least some of the resources may be reserved for the guaranteed status participants, to enable the guaranteed status participants to participate in the conference. When another participant to the conference is received, the other participant may be assigned a provisional status. Unused resources in the pool of resources may be allocated as provisional resources to the provisional status participant and the participant is admitted to participate in the conference utilizing the provisional resources. The provisional resources may be reserved for, but are at the time not used by a guaranteed status participant. Borrowed resources may be reclaimed and transferred to the guaranteed status participant.

31 Claims, 5 Drawing Sheets

METHOD AND SYSTEM FOR ALLOCATING, REVOKING AND TRANSFERRING RESOURCES IN A CONFERENCE SYSTEM

FIELD

The present invention relates generally to communication systems and more particularly to a method and system for allocating, revoking and transferring resources in a conference system.

BACKGROUND

Historically, telecommunications have involved the transmission of voice and fax signals over a network dedicated to telecommunications, such as the Public Switched telephone Network (PSTN) or a Private Branch Exchange (PBX). Similarly, data communications between computers have been historically transmitted on a dedicated data network, such as a Local Area Network (LAN) or a Wide Area Network (WAN). Currently telecommunications and data transmissions are being merged into an integrated communication network using technology such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. Voice conversations are therefore routed over the Internet or any other IP-based network.

Known communication networks often support multipoint conferences between a number of participants using different communication devices. A multipoint control unit (MCU) (sometimes referred to as a Multipoint Control Unit is used to couple these devices, which allows users from distributed geographic locations to participate in the conference. Each MCU includes or presents a finite amount of MCU resources to accommodate one or more multipoint conferences, at a given point in time. The number of conferences that an MCU is able to accommodate at a given point in time therefore depends largely on the availability of resources of the MCU. The conference may be audio only (e.g. a teleconference) or it may include video and/or data conferencing/broadcasting. An example of a conferencing system with properties as described above is provided by the H.323 standard.

One of the key resources that conference administrators may need to indicate when setting up a conference call is the number of ports required for the conference. Reservation of the "correct" number of conferencing ports can be a balancing act. If too few ports are reserved for the conference, some people who would like to join and contribute may be left out because there may not be enough resources to accommodate them. However, if too many ports are reserved then some ports may remain unused and are therefore not available for another conference, which may take place simultaneously. This increases the cost of conducting a conference and potentially prevents other users from conducting a conference at the same time. Conferencing resource costs and scarcity have lead to a number of mechanisms for allocating and reclaiming resources. One area of contention is the conflicting goal of balancing so-called "reservation systems" and their implied guaranteed availability of resources with so-called "on demand" or "ad hoc" systems that allow spontaneous resource allocation. In particular, to accommodate "reservation holders", presently known systems terminate conferences and/or remove participants from conferences, in order to satisfy the demands of current and subsequent reservation holders. More particularly, when the resources are full or nearly full, running conferences are forcibly terminated when their reserved time expires, so that the resources may be freed up for reservation holders to a subsequent conference. This process of reclaiming resources occurs even if the resources are not immediately required or used by some of the reservation holders, for example where at least some of the prospective participants to the subsequent conference have not yet joined the conference. Existing systems have limited means of adapting to heavy resource loading. Specifically they may unnecessarily terminate conferences to accommodate subsequently starting conferences (even if all the reserved resources may ultimately not be required) and they prevent access to a conference even though reserved resources are in fact not used at the time.

BRIEF DESCRIPTION OF DRAWINGS

The present invention is illustrated by way of example and not limited by the figures of the accompanying drawings, in which.

DETAILED DESCRIPTION

In the following description, for purposes of explanation, numerous specific details are set forth in order to provide a thorough understanding of example embodiments of the present invention. It will be evident, however, to one skilled in the art that the present invention may be practiced without these specific details.

Figure 1:
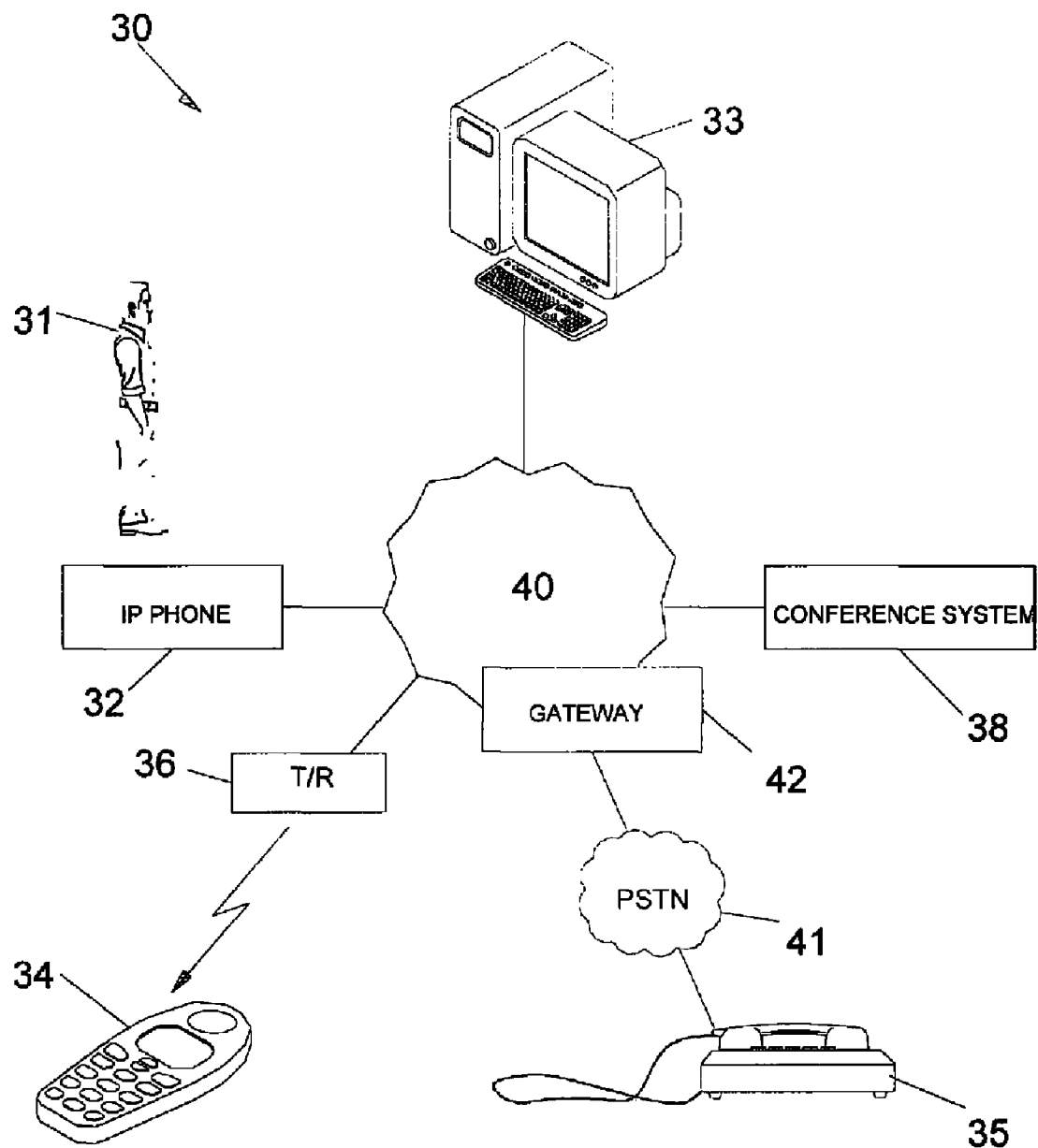
FIG. 1 illustrates a communication system comprising a plurality of endpoints operable to communicate among each other and a conference system, in accordance with an example embodiment.

FIG. 1 illustrates a communication system 30 including a plurality of endpoints comprising example devices 32-35 respectively having the ability to establish communication sessions with each other and/or users of the devices and/or a conference system 38. Such communication sessions may be established using communication networks 40, 41 and/or additional endpoint devices, components or resources coupled with the communication networks 40 or 41. The conference system 38 may provide multipoint conference services, such as planning and reserving resources for a multipoint conference between a plurality of distributed participants. The conference system 38 may further host and facilitate conferences to users of endpoints 32-35, such as user 31 of endpoint device 32 (e.g., a softphone or the like). In example embodiments, the conference system 38 includes a multipoint control unit (MCU) that hosts, or accommodates, multipoint conferences between and among endpoints 32-35. An MCU or other entity may be considered to be hosting a conference if it is one or more of the components that accommodates or otherwise provides conference resources to facilitate the conference.

Conferences may include communication sessions, between a plurality of users, transmitted using any audio, video, chat, IM collaborative session or other means, including signals, data or messages transmitted through voice and/or video devices, text chat, web sessions, and instant messaging.

In accordance with example embodiments a system and a method are provided that allow the conference system 38 to allocate, revoke and transfer resources utilized by participants, such as the user 31, of the conference. The conference resources may include, but is not limited to resources for a multipoint conference, such as communication ports, digital signal processing (DSP) resources, mixers, interfaces, MCUs, processors, memory modules, management units, media termination ports and/or other components necessary to accomplish the functionality and features described herein, whether the resources are implemented in hardware or in software.

In an example embodiment, a method of allocating resources from a pool of conference resources presented by a conference system comprises assigning a guaranteed status to at least some participants to a first conference to be hosted by the system; reserving at least some of the pool of resources for the guaranteed status participants to enable the guaranteed status participants to participate in the first conference; receiving at least one other participant to the first conference and assigning a provisional status to the at least one other participant; and allocating unused resources in the pool of resources as provisional resources; and admitting the at least one provisional status participant to participate in the first conference utilizing the provisional resources. The provisional resources may be unreserved, the provisional resources may reserved, or be any combination thereof. For example, the provisional resources may be reserved for the first conference. Alternatively, the provisional resources may be reserved for a second conference to be hosted by the system. In an example embodiment, the resources may be reserved for specific prospective participants or guaranteed status participants. At least part of the provisional resources may be revocable during the first conference and transferred to a guaranteed status user of either the first conference or the second conference.

Normally, a fixed number of resources are reserved for a specific multipoint conference. The amount of resources which are reserved is based on an expected or predicted number of participants to participate in the conference. According to an example embodiment of the method, the conference system 38 may assign the guaranteed status to participants who are required to participate in the conference or to participants whose participation is certain. When these participants join the conference, they may be allocated the resources reserved for them, to enable them to participate in the conference. They are hence able to join the conference at any time during its currency and to take part in the conference. Participants who are not specifically required to join the conference and who may therefore not be assigned the guaranteed status, but who nevertheless wish to participate in the conference, may be assigned the provisional status. When a provisional status participant joins the conference, the participant may be allocated resources in the pool of resources that are unused at the time as provisional resources, and admitted to the conference to take part therein utilizing the provisional resources. These unused resources may be reserved for a guaranteed status participant to the first or another conference hosted by the conference system. When the guaranteed status participant later joins the first or the other conference, the provisional resources may be reclaimed from the provisional status participant, revoked and allocated to the guaranteed status participant, to enable the guaranteed status participant to participate in the conference. The resources utilized by the provisional status participant may therefore merely be "borrowed" by the participant and these resources could be reclaimed at any time. If, for example, the resources were originally reserved for a second conference occurring substantially simultaneously with the first conference, but the resources (reserved or otherwise available) are unused at the time the provisional status participant wants to join the first conference, the unused resources may be allocated to the participant as provisional resources until the resources are reclaimed as will hereinafter be described in more detail.

Each of the endpoint devices 32-35 may comprise any combination of hardware, software and/or encoded logic that provide communication services to a user. For example, the endpoint devices 32-35 may include a telephone, a mobile phone, a computer running telephony software (softphone), a video monitor, a camera or any other communication hardware, software and/or encoded logic that supports the communication of media using the communication networks 40 and 41. In an example embodiment, the endpoint devices 32-34 which are coupled to the communication network 40, include an internet protocol (IP) phone, a personal computer and a mobile or cellular phone, respectively. Endpoint device 35 is a telephone that is coupled to the communication network 41. A wireless base station transmitter/receiver (T/R) couples the mobile phone 34 with the communication network 40. Endpoint devices 32-35 may also comprise unattended or automated systems, gateways, other intermediate components or other devices that can establish media sessions. Although FIG. 1 illustrates four endpoint devices 32-35, the communication system 30 contemplates any number and arrangement of endpoint devices 32-35 for communicating media and participating in a conference. For example, the described technologies and techniques for establishing a communication session between or among endpoints 32-35 may be operable to establish a multipoint conference between any number (larger than two) of distributed endpoint devices.

The term "communication network" should be interpreted to include any network capable of transmitting audio, video, chat, IM, and/or collaboration sessions in the form of signals, data and/or messages. The communication network 40 may be any computer or communication network capable of coupling two or more endpoint devices 32-35, for communication. In an example embodiment, the communication network 40 is a wide area network (WAN) that enables communication between a plurality of endpoint devices distributed across multiple cities and geographic regions, and communication network 41 is a public switched telephone network (PSTN). However, the communication networks 40 and/or 41 may comprise one or more networks, including the Internet, a public switched telephone network (PSTN), local area networks (LANs), global distributed networks such as intranets and extranets and/or other forms of wireless or wired communication networks. Generally, the communication networks 40 and 41 may provide for the communication of packets, cells, frames and/or other portions of information (generally referred to as packets) between and among the endpoint devices 32-35. Communication paths for the communication of such packets may include any combination of routers, hubs, switches, gateways (e.g., a gateway 42) or other hardware, software or embedded logic implementing any number of suitable communication protocols that allow for the exchange of packets in the communication system 30.

In an example embodiment, the communication network 40 may employ communication protocols that allow for the addressing or identification of the endpoints 32-35 coupled to the communication network 40. For example, using Internet protocol, each of the components coupled together by the communication network 40 in the communication system 30 may be identified in information directed using IP addresses. In this manner, the communication network 40 may support any form and combination of point-to-point, multicast, unicast or other techniques for exchanging media packets among components in the communication system 30. Any given communication session between two of the endpoints 32-35 may include the transfer of packets across one or more communication paths that couple the endpoints 32-35 and/or the conference system 38 across the communication networks 40 and 41. Such paths may include any combination of network components, gatekeepers, call managers, routers, hubs, switches, gateways, endpoints or other hardware, software or embedded logic implementing any number of communication protocols that allow for the exchange of packets in the communication system 30. The network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, the network 40 may also be coupled to non-IP telecommunication networks through the use of appropriate hardware, such as the gateway 42. For example, the network 40 is shown to be coupled to a PSTN 41. The PSTN 41 may include switching stations, central offices, mobile telephone switching offices, pager switching offices, remote terminals and other related telecommunications equipment that are geographically dispersed. IP networks transmit data (including voice and video data) by placing the data in packets and sending each packet individually to the selected destination. Unlike a circuit-switched network (e.g., the PSTN 41), dedicated bandwidth is not required for the duration of a call, collaboration session, or fax transmission over IP networks. Instead, each telephony device sends packets across the network as they become available for transmission. This feature makes bandwidth available for other data when voice or fax data is not being transmitted. The technology that allows telecommunications to be transmitted over an IP network may be referred to as Voice over IP (VoIP). In an example embodiment, the endpoint devices 32-34 and the conference system 38 are shown to be IP telephony devices. IP telephony devices have the capability of encapsulating data relating to a user's voice (or other inputs) into IP packets so that the data can be transmitted over the network 40. Similarly, the IP telephony devices 32-34 have the capability of optionally capturing and encapsulating video data into IP packets so that the video data can be transmitted over network 40. Conversely, the IP telephony devices 32-34 have the capability of receiving IP packets comprising voice, video, chat, IM, and/or collaboration session data from the network 40 and reproducing the associated audio, video chat, IM, and/or collaboration session to a user or conference participant. A codec (coder/decoder) at the endpoint converts the voice, video or fax signals generated by the users of the telephony devices from analog media signals into digital form. The codec may be implemented either in software or as special-purpose hardware at or in the endpoint devices. In the case of the IP telephone 32, as the user 31 speaks into the handset, the codec converts the analog voice signals into digital data. The digitally encoded data is then encapsulated into IP packets so that it can be transmitted over the network 40. Conversely, another codec at a receiving endpoint converts the digital data into analog media for the users of the telephony devices at the receiving endpoints. At the IP telephone 32, IP encapsulated packets are also received from the network 40. The codec at the endpoint converts the digital data relating to voice, video or other data from the network 40 into analog media to be played to the user of the IP telephone.

The gateway 42 may, for example, accomplish several functions, such as converting analog or digital circuit-switched data transmitted by the PSTN 41 to packetized data transmitted by the network 40 and vice-versa. When voice data packets are transmitted from the network 40, the gateway 42 retrieves the data contained in the incoming packets and converts this digital data to the analog or digital format used by the PSTN trunk to which the gateway 42 is coupled. Since the digital format for voice transmissions over an IP network is often different from the format used on the digital trunks of the PSTN 41, the gateway 42 provides conversion between these different digital formats, which is referred to as transcoding. The gateway 42 may also translate between the VoIP call control system (e.g., MGCP, H.323, SIP, etc.) and other signaling protocols (e.g., SS7, T1, ISDN, etc.), used in PSTN 41.

For voice transmissions from the PSTN 41 to the network 40, the process is reversed. In an example embodiment, the gateway 42 receives the incoming voice transmission (in either analog or digital form) and converts it into the digital format used by the network 40. The digital data is then encapsulated into IP packets and transmitted over the network 40.

Figure 2:
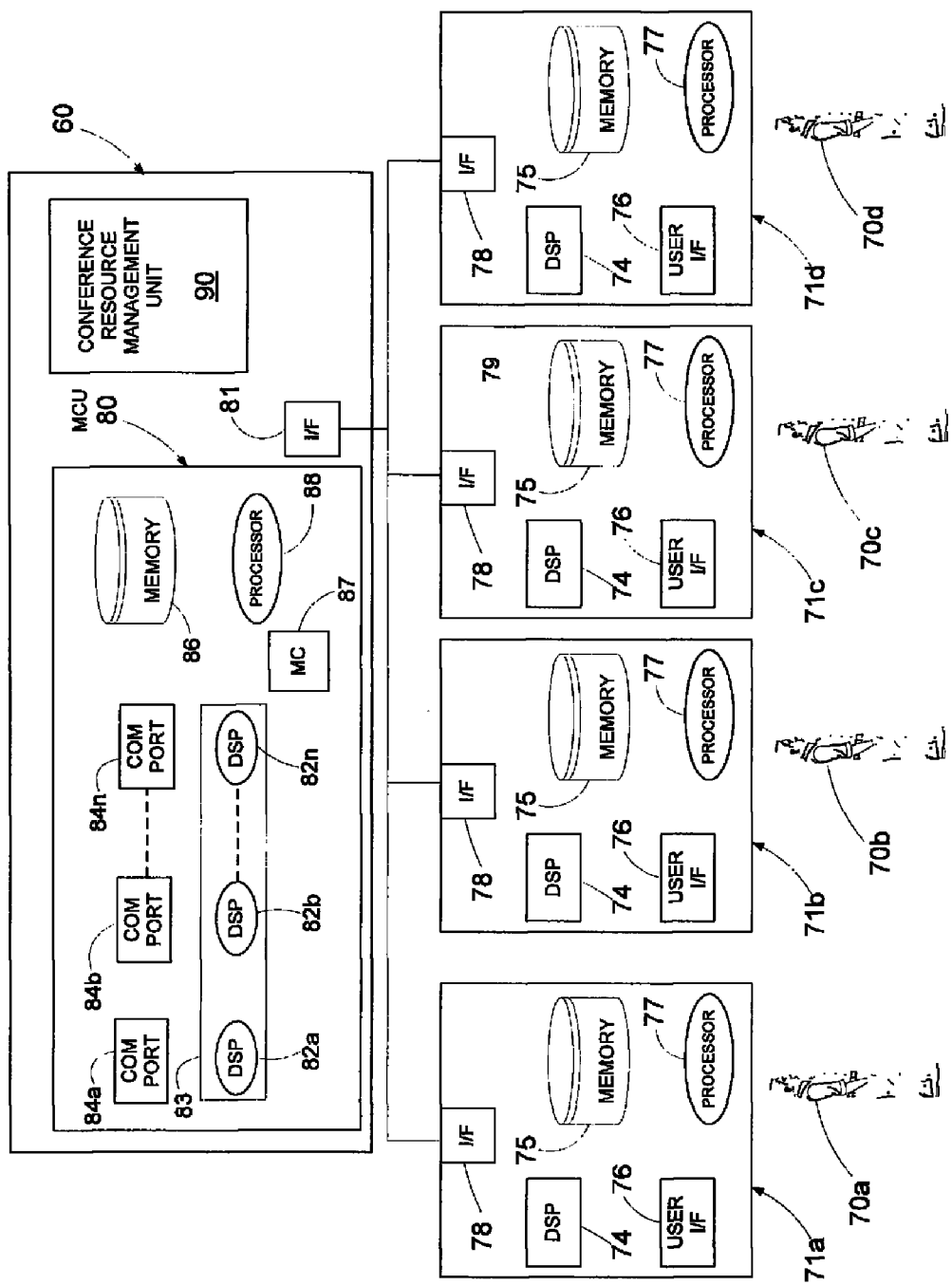
FIG. 2 illustrates the example conferencing system in more detail.

FIG. 2 illustrates a conference system 60 in more example detail. The conference system 60 may be similar to the conference system 38 illustrated in FIG. 1. The conference system 60 is coupled to a plurality of distributed endpoints 71*a* to 71*d*, in accordance with an example embodiment. The conference system 60 may provide multipoint conference services, including conference hosting and/or facilitation, to users 70*a* to 70*d* of endpoints 71*a* to 71*d* and may provide similar functionality as that provided by the conference system 38 discussed by way of example above. In an example embodiment, the conference system 60 includes an MCU 80, a conference resource management unit 90 and an interface 81 through which the conference system 60 is coupled to the network (e.g., network 40 of FIG. 1) and over which it receives calls for conferencing. The MCU 80 may provide multipoint conference functionality between participants/users 70*a*-70*d* using endpoints 71*a*-71*d*. The MCU 80 may further include a Multipoint Controller (MC) 87, which may control all negotiations between the endpoints 71*a*-71*d* to determine common capabilities for audio, video, chat, IM, and/or collaborative session data processing and zero or more Multipoint Processors (MP) 83. In an example embodiment, the MC 87 in coordination with Conference Resource Management Unit 90 may control the reclaiming, revocation and transfer of resources between the participants 70*a*-70*d* of the conference. The conference resource management unit 90 may manage resources of conference system such as conference ports, bandwidth, DSP resources 82*a*-82*n*, or the like. The endpoints 71*a*-71*d* may be similar to one or more of the endpoints described above with respect to FIG. 1, such as the IP phone endpoint 32. It should be understood that the endpoints 71*a*-71*d* may be coupled to components of the conference system 60 such as the MCU 80 and the conference resource management unit 90 through one or more communication networks, such as the communication networks 40 and 41 described above by way of example with respect to FIG. 1 which may include one or more WANs or LANs as indicated above.

Although not shown in FIG. 2, it should be understood that the conference system 60 and the endpoints 71a to 71d may all be coupled to each other via one or more of the networks (e.g., the networks 40 or 41 of FIG. 1). In an example embodiment, the endpoints 71a-71d may each include a digital signal processor (DSP) 74, memory 75, a user interface 76, a processor 77 and an interface 78. Each endpoint 71a to 71d may be coupled to the conference system 60 through a respective interface 78. The DSP 74 may include a codec that converts voice, video or IM signals generated by the users of the telephony devices from analog media signals into digital form and vice-versa. The codec may be implemented either in software or as special-purpose hardware in the endpoints. The memory 75 may include any form of volatile or nonvolatile memory including, without limitation, magnetic media, optical media, random access memory (RAM), read only memory (ROM), removable media or any other suitable local or remote memory component. The memory 75 may store information about the endpoint and/or its user(s). The processor 77 may comprise one or more microprocessors, controllers or any other suitable computing devices or resources. The user interface 76 may include a microphone, video camera, speaker, keyboard, video display, LCD display and/or other device. In some embodiments, an endpoint's user interface 76 may be coupled with one or more components that include one or more of a microphone, video camera, speaker, keyboard, video display and/or other device, rather than incorporating such components into the endpoint. The MCU 80 may act as an intermediary during the multipoint communication conference, collects audio, video, chat, IM and/or collaborative session streams transmitted by the participants through their endpoints and distributes such streams to participants of the multipoint conference at their endpoints. The MCU 80 may include any bridging or switching device used in support of multipoint conferencing, including videoconferencing.

In an example embodiment, the MCU 80 may include hardware, software and/or embedded logic. The MCU 80 may be configured to support any number of conference endpoints communicating on any number of conferences, simultaneously. The MCU 80 may be in the form of customer provided equipment (CPE), e.g., beyond the network interface, or may be embedded in a wide area network (WAN). Examples of multipoint conference unit standards are defined in ITU-T H.323, with T.120 describing services for real-time, multipoint data connections and conferencing.

The MCU 80 may utilize certain resources to effectively host each conference. In the example embodiment, the MCU 80 includes a plurality of digital signal processors (DSPs) 82a-82n, a plurality of communication ports 84a-84n, a processor 88 and memory arrangement 86. The DSPs 82a-82n may include codecs that decode received media streams so that they may be bridged together to form a mixed stream that is coded by the DSPs 82a-82n for transmission to conference participants. In an example embodiment, the MCU 80 may include software functioning as a DSP on a general purpose central processing unit, such as the processor 88. The communication ports 84a to 84n may comprise audio, video, chat, IM, collaborative session and/or other data communication ports. The memory arrangement 86 may comprise any form of volatile or nonvolatile memory including, without limitation, magnetic media, optical media, random access memory (RAM), read only memory (ROM), removable media or any other suitable local or remote memory component. The processor 88 may be a microprocessor, controller or any other suitable computing device or resource.

The conference resource management unit 90 may comprise any suitable hardware, software or encoded logic to accomplish the functionality described herein, such as a processor or controller executing software. The conference resources managed by the conference resource management unit 90 may include any hardware or software component utilized by an MCU for hosting a conference between participants. Conference resources may include, for example, bandwidth, audio and video communication ports or trunks and DSP resources for transcoding or mixing. Resources available to MCUs may be utilized across any number of conferences occurring simultaneously and between any number of endpoints.

As an example, if an MCU has a certain number of communication ports available for conference use, one conference may utilize some of the communication ports, and another or second conference (or any other number of conferences) occurring simultaneously may utilize some other communication ports. Not all the communication ports are necessarily reserved and/or utilized at a specific time. The unused ports may therefore be available for use by any provisional status participants in any conference at that time. In an example embodiment, unused-reserved ports and unused-unreserved ports may be provided. For example, anyone may use the unused-unreserved ports. However, in an example embodiment, unused-reserved ports may be utilized by the provisional participants. In an example embodiment, some of the MCU's communication ports may be reserved for guaranteed status participants. For example, the users 70a-70c may have guaranteed status and are thus guaranteed use of the reserved resources. However, when a guaranteed status participant leaves the conference, the communication ports and other resources utilized by that guaranteed status participant may be made available to a provisional status participant, as will be described by way of example hereinafter, a provisional status participant could change his status from provisional status participant to a guaranteed status participant.

Consider for example the following scenario where user 70c, acting as conference organizer uses endpoint 71c, enters information into conference system 60 to establish a conference. After entering, for example, the appropriate start time and date, as well as the expected duration, and possibly the topic, the user 70c determines that he wants to make sure that users 70a and 70b are not precluded from attending the conference due to insufficient conference resources. When user 70c sets up the conference he may send a request to the conference system 60 indicating that the users 70a and 70b are to be guaranteed status participants. Accordingly, the user 70c may have designated himself and the users 70a and 70b as guaranteed participants. The conference system 60 may therefore reserve resources for the three guaranteed status participants. Therefore, the resources they utilize when joining the conference are those resources that have been specifically reserved for them. They do not need to compete for resources from a pool of resources for which other participants may be competing. In this example, the user 70c may have sent a request for a conference to which he requires users 70a, 70b and 70c to be guaranteed participants. In the given example, when the conference system 60 sets up the scheduled conference it will reserve three sets of resources for the conference, one set of resources for each of users 70a, 70b and 70c. The resources reserved for the users 70a, 70b and 70c may be separately attached to each one of them, for example, from the scheduled start time of the conference to the scheduled end time of the conference. In the given example, should the user 70d want to participate in the conference, he would be assigned a provisional status and therefore utilize unused resources from a pool of unused resources (e.g., from resources reserved for this or one or more other conferences), but which are currently unused. In an example embodiment, the conference system 60 may first allocate resources from the general pool of unreserved and unused resources to a provisional status participant. Should there not be any available unused resources in the general pool of resources, the conference system may allow the provisional status participant to use unused resources reserved for this or other conferences.

It should be understood that any one of the guaranteed status participants could exchange his reserved resources with the provisional resources of a provisional status participant at any time before or during a conference. For example participant 70d could change his provisional status with the guaranteed status of any one of users 70a, 70b or 70c, whom would then become a provisional status participant. As indicated above, in an example embodiment, the conference system 60 may not only reserve resources generally for a conference, but also reserve resources for specific users 70a to 70d. This, in effect, may guarantee a user, for example the user 70a, who has resources reserved for him, such as a conference port, access to a conference, regardless of the number of actual attendees compared to the number of scheduled attendees. In case a conference is canceled or resources are freed up due to any other reason, the provisional users may be informed of the available resources and may be provided with the option of securing these resources for themselves. If a provisional user elects to secure the available resources his status may change from a provisional user to a guaranteed user.

Continuing with the example scenario above in which the users 70a and 70b are required invitees and the user 70c was the user who set up the conference, the conference system 60 may reserve a set of resources, for example the communication ports 84a-84c and the DSPs 82a-82c, to cover the three guaranteed attendees. Should more resources be reserved for the conference than those needed for the guaranteed status participants, the available reserved resources would be open for use by any other participant, wishing to participate (e.g., in this conference or another conference hosted by the conference system 60). The other participants may, however, have to compete for the available resources reserved for the conference. If more participants want to attend the conference than there are resources reserved for the conference then, after the available reserved resources have been used, the additional participants may be assigned provisional participant status, and they may be placed in a queue, which may be maintained within the conference resource management unit 90, to await the availability of unused resources either from the pool of unused resources or from unused reserved resources for this or other conferences. In an example embodiment, the conference system 60 may increase the number of general resources originally reserved for the conference to accommodate the additional users who wish to attend. The number of additional resources that may be reserved for the conference may depend on how rigid the scheduling protocol of the conference system 60 has been configured and on the number of resources not already reserved for other conferences or invitees, during the entire scheduled duration of the current conference.

Figure 3:
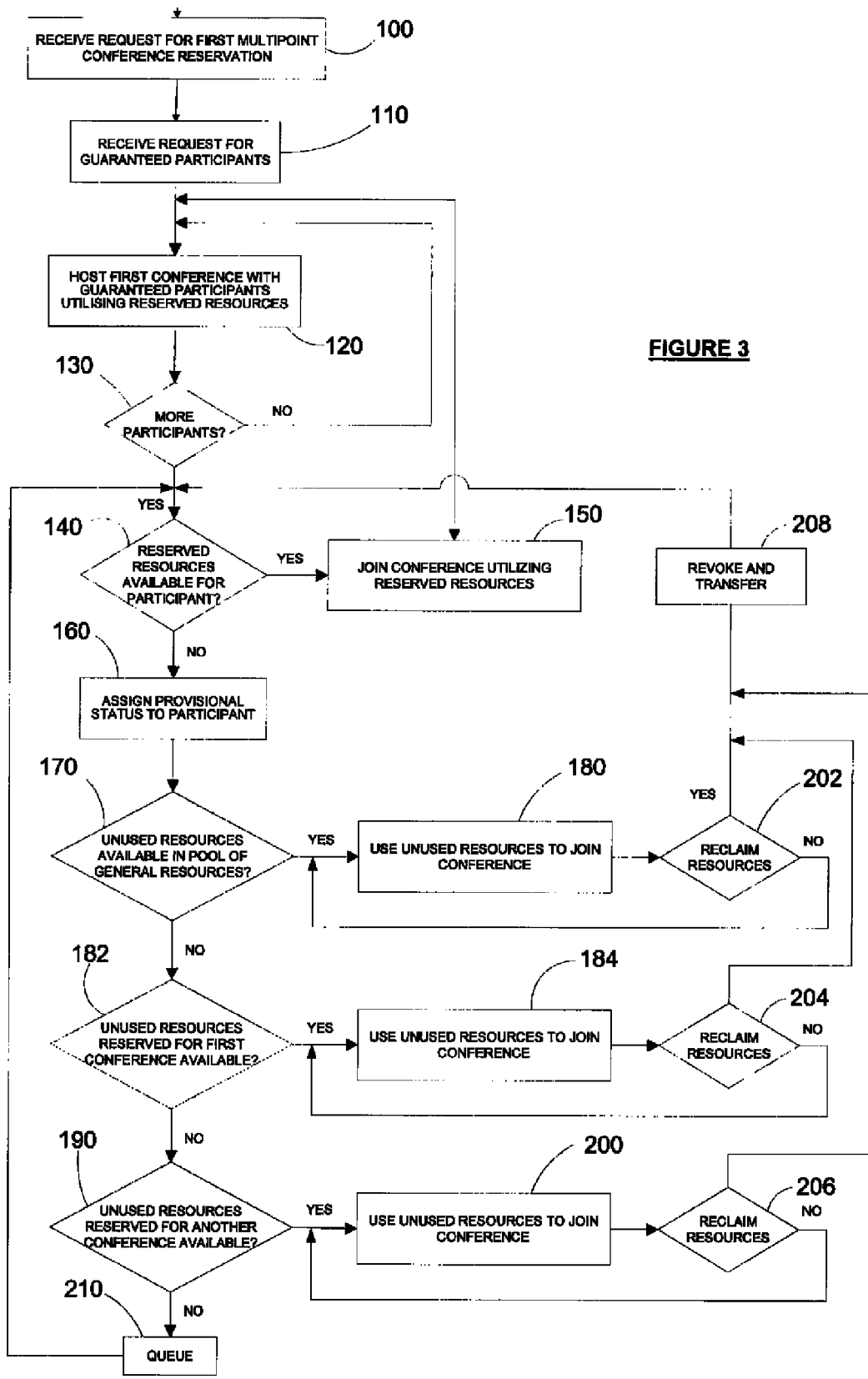
FIG. 3 shows a flowchart of a method of allocating, revoking and transferring resources in a conference system, in accordance with an example embodiment.

FIG. 3 is a flowchart illustrating an example embodiment of a method of allocating resources in a pool of conference resources presented by conference system (e.g., the conference system 60), and reclaiming, revoking and transferring the resources. At block 100 a first conference reservation request is received by the conference system 60 from conference organizer, for example the user 70c using the endpoint 71c. The request to set up the conference may include information such as a list of invitees, a list of required (and therefore guaranteed) invitees, the number of expected attendees, a date, a start time and a duration of the conference. Additional information such as the subject or purpose of the conference could also be entered at this time. At block 110, resources for a specific number of guaranteed status participants are reserved and these participants have guaranteed use of the reserved resources and will always be permitted entry. The conference is shown to be hosted at block 120, for example, with guaranteed status participants utilizing at least some of the reserved resources. Should an additional participant wish to join the conference at decision block 130, the method may first check at block 140 whether or not there are resources reserved in a pool of resources for the conference or participant. If there are reserved resources available for the participant, he will be assigned guaranteed status and the reserved resources may be allocated to him to enable him at block 150 to participate in the first conference utilizing those reserved resources. If there are no reserved resources available, the method may assign at block 160 a provisional status to the additional participant and at block 170, the conference method may check whether or not there are any unreserved and unused resources available from a pool of general unused resources. If there are unreserved and unused resources available, the provisional status participant may be allocated these resources as provisional resources, and admitted at block 180 to participate in the first conference utilizing the provisional resource. If a provisional resource is not available, the method may check at block 182 whether there are any unused resources available which have been reserved for the first conference. If so, the provisional status participant may be allocated these resources as provisional resources and admitted at block 184 to participate in the first conference utilizing these provisional resources. If such resources are not available, the method may checks at block 190 whether at the time there are unused resources available which have been reserved for a second conference. If there are such unused resources, the provisional status participant may allocated these resources as provisional resources and admitted at block 200 to participate in the first conference utilizing these provisional resources. As will hereinafter be described by way of example in more detail, at blocks 202. It should however be noted that in an example embodiment at block 202 the resources may not be reclaimed. For example, the provisional users may be provided with an opportunity to secure their resources as the resources they are utilizing are not in use and are not reserved for any other conference. In blocks 204 and 206 the method may check whether the provisional resources used by the provisional status participant ought to be reclaimed for any reason, for example in the case at blocks 204 and 206, in that the provisional resources are now required by a guaranteed status participant to the first or a second conference as the case may be, and for whom they have been reserved as aforesaid. However, before the resources are reclaimed, all the participants may be advised that the provisional resource used by a specific provisional status participant is about to be reclaimed. To reclaim the provisional resource they may be revoked in respect of the provisional status participant and transferred to the guaranteed participant for whom they have been reserved as aforesaid. Should the provisional status participant wish to remain in the conference, he may request to exchange his provisional status with the guaranteed status of one of the guaranteed status participants. If a guaranteed status participant indicates that he accepts this request to change status, the method may exchange the respective status of the guaranteed status participant and the provisional status participant.

Upon admission or entry, or at such time as provisional resources may need to be reclaimed, the provisional participant may be informed that his access is provisional. An audible indication might be: "Welcome, there are more participants than expected in this conference. You are being provided access now, but your access may be revoked at any time." At entry and/or at resource reclamation time the guaranteed status users may be informed of the presence of one or more provisional users: "X more participants are present than planned." As stated hereinbefore, the provisional status participant may be provided an opportunity before or during the conference to "exchange status" with any guaranteed status participant. An example method to exchange status may be via an audible prompt following the aforementioned provisional status notification: "If you wish to guarantee continued presence in this conference press '#5' and a participant with guaranteed status can then switch status with you." Upon pressing '#5', all the guaranteed status participants (those who arrive before the reserved resource limit is reached, or who have particular privileges as described below) may also relinquish their guaranteed status for provisional status. An example method to accomplish this may be as follows. When a provisional status participant presses '#5' as described by way of example, an announcement may be made to all of the guaranteed users "John Smith has requested guaranteed status for this conference. To exchange your guaranteed status for his provisional access, press '*#5'". It will be appreciated that many other mechanisms or methods may be employed as well, including graphical user interface (GUI) interactions, chat, web browser interface etc. Additional controls are possible as well, e.g. activation of keys '#5 1' might be construed as a request to exchange places with the first guaranteed status participant who indicates that he is prepared to accept an exchange of status. In addition, any participant can elect provisional status for themselves by pressing a key sequence (e.g. '##5'). This latter capability is well suited to those who join conferences but are not required participants. The conference organizer may also specify at reservation time which users should be given guaranteed or provisional status when they enter the conference.

Therefore, before or during a conference, a provisional status participant may request to change status with a guaranteed status participant. Any guaranteed status participant may request to change status with a provisional status participant or relinquish that guaranteed status. A plethora of methodologies may be used to relinquish guaranteed status, including, but not limited to DTMF sequences, web interaction, soft keys on the phone, chat interaction, or conference client API controls. A guaranteed participant may be allowed to relinquish guaranteed status to a particular participant with provisional status, or abandon his guaranteed status for provisional status. Conversely, a provisional status participant may request guaranteed status via any of the methodologies described hereinbefore and the guaranteed status participants may be enabled and permitted to respond thereto.

For example, suppose the user 70c is setting up a first conference and he wants the users 70a and 70b to participate as well as anyone else who may be interested, but whose presence is not critical, and thus does not need to be guaranteed. The user 70c may then designate the users 70a and 70b as guaranteed status participants, and resources would be reserved specifically for them. Even if the users 70a and 70b want to join a conference in which there are more general attendees that want to attend than there are resources that were initially reserved for the conference, the users 70a and 70b would be able to join the conference. Thus, it is the provisional attendees that may have more difficulty to obtain the necessary resources required for attending the conference. The provisional status participant may have to use provisional resources which are at the time unused, but which are subject to being reclaimed at any time, as and when they are needed by the participants that may have reserved them.

To maintain an orderly conference, and merely by way of example, the following methods of revoking user access may be employed: a) a private announcement or indication to provisional status participants that their provisional resources are about to be reclaimed. For example: "Attention. Your resources are required for another conference or participant. Goodbye." As stated hereinbefore, reclamation of provisional resources does not imply that all provisional resources must be reclaimed. A provisional status participant may be moved from full audio-video capability to audio only, or from audio only capability to chat-only. In the latter cases the messages may be: "There are insufficient resources for you to continue receiving Video, but you will be able to continue to participate in the audio portion of this meeting." Also in this latter case, it may still be possible for the provisional status participant to "exchanged status" with a guaranteed status participant as described hereinbefore and in so doing, have full resources or capabilities. In an example embodiment, the system (or method) may be configured whenever possible first to preempt provisional status participants who are listeners rather than talkers; b) conference-wide announcement(s) that provisional resources will be reclaimed in an announced period of time. One such example may be: "Two provisional users will be removed in 10 seconds to accommodate prior reservations." At such time guaranteed status participants may opt to become provisional status participants or leave the conference or participants may discuss among themselves to determine who should have continued presence and hence guaranteed status. Alternatively, the participants may elect to end the conference. Each of these can be accomplished using one or more example methods already described; c) a public announcement to all the conference participants upon the forced departure of a provisional status participant with an optional additional message indicating the reason for departure, for example: "Now leaving John Smith due to insufficient resources"; and d) ending the entire conference.

The order or sequence in which resources are allocated and reclaimed may be based on a directory or rank of the participants. For example, certain users or classes of users may always be assigned guaranteed status. These users may include the conference organizer, users with special permissions, or users identified at conference reservation time. All other users, more particularly all ad hoc users may be given provisional status by default. The guaranteed or provisional status can be made to apply only to a "seat" to a specific conference or to the user.

In the event that a special guaranteed status user with guaranteed status arrives, other users with guaranteed states can be downgraded to provisional status on the basis of a multi level priority protocol, entry order, permission level, length of time in the conference or system, whether participant is associated with guaranteed status for more than one substantially simultaneous conference, or even at random. A plurality of provisional status participants may also be preempted according to similar factors.

Figure 4:
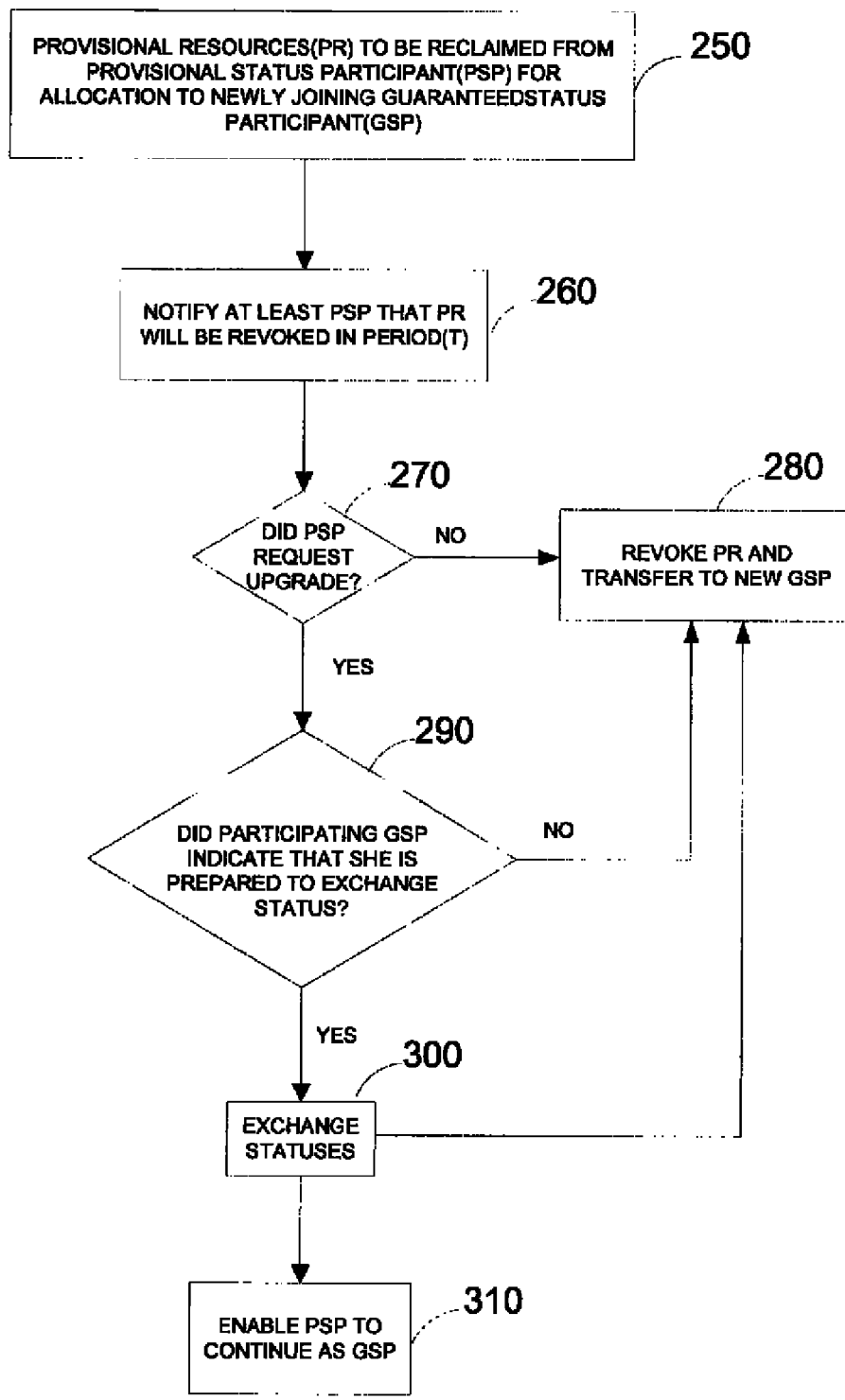
FIG. 4 shows a more detailed flowchart of a method of revoking and transferring resources in a conference system, in accordance with an example embodiment.

FIG. 4 is a flowchart illustrating a method for revoking and transferring resources in accordance with an example embodiment. The method illustrated in FIG. 4 may relate to a scenario where provisional resources "borrowed" and utilized by a provisional status participant are to be reclaimed (see block 250), since they may be needed for a newly joining guaranteed status participant (GSP) of any conference and for which they were reserved. As shown at block 260, before the resources are revoked, at least the provisional status participant and, in an example embodiment, all participants to the conference in which the provisional status participant is participating, may be notified that the provisional resources will be reclaimed in specified period of time (T). At block 270, the provisional status participant (PSP) may decide whether or not it is necessary that he remains a participant in the conference. Should the provisional status participant decide that it is not necessary to remain a participant in the conference, no further step need be taken by him. The provisional resources may be revoked in block number 280 after the aforementioned period of time T, his participation terminated and the resources may be transferred by the method to the newly joining guaranteed status participant. However, if the provisional status participant is required to take further part in the conference, he may indicate at block 270 that he wants to upgrade to the status of guaranteed status participant with a concomitant exchange of resources as hereinbefore describe. If at block 290 no participating guaranteed status participant has indicated a willingness to exchange status with the provisional status participant, the provisional resources may still be revoked after the aforementioned period of time T as shown at block 280. The participation of the provisional status participant may be terminated and the provisional resources may be transferred to the newly joining guaranteed status participant. However, if at block 290 a participating guaranteed status participant indicates that he is willing to exchange status with the provisional status participant, statuses are exchanged at block 300 and resources are made available to the erstwhile provisional status participant at block 310, to enable him to continue participating in the conference, but now as guaranteed status participant. The erstwhile participating guaranteed status participant's participation may be terminated and the reclaimed resources may be made available to the newly joining guaranteed status participant as shown at block 280.

As stated hereinbefore, the revocable resources used by a provisional status participant could be revoked only partially and not entirely. For example, the provisional status participant could have used full audio and video resources, and after reclaiming the revocable resources, the provisional status participant may still have used of the audio resources.

The system and method could further be configured automatically to revoke the provisional resources allocated to a provisional status participant who listens only and who does not actively participate in the conference, before revoking the provisional resources allocated to another provisional status participant who more actively participates in the conference.

Some of the steps illustrated in FIGS. 3 and 4 may be combined, modified or deleted where appropriate and additional steps may also be added to the flowcharts. Additionally, steps may be performed in any suitable order without departing from the scope of the invention.

According to an example embodiment, resources may be reserved for participants in general and a guaranteed status may be attached to the resources and not to the participants as such. Therefore, those participants who arrive at the conference first would be allocated the guaranteed resources on a first-come-first-serve basis. Participants joining after all the guaranteed resources have been allocated, may be assigned provisional status and may have to wait for available unused resources. The provisional status participants may then freely exchange their status with that of a guaranteed status participant. Therefore, should a participant arrive later, but who may be essential to the conference, he may exchange his provisional status with that of a guaranteed status participant.

In an example embodiment, the guaranteed status could be attached to specific users. Only those participants would therefore be guaranteed access to the conference. Any other participant wishing to join the conference may be assigned provisional status and may have to wait for available unused resources.

In an example embodiment, the system and method could automatically downgrade a guaranteed status participant to a provisional status participant. Upon requesting resources for a conference to be reserved, the invitee could instruct the system to automatically downgrade any guaranteed status participant, when a predetermined participant joins the conference. This automatic downgrading could take place randomly, depending on the rank of the participant joining the conference, or depending on the time that the participants have been using the reserved resources. For example, participants could be assigned a rank, and once a participant with a higher rank joins the conference, a participant with a lower rank, or the participant with the lowest rank, using reserved resources, could be downgraded automatically to a provisional status participant, while the higher ranking participant would become a guaranteed status participant.

Although example embodiments have been described in detail, it should be understood that various other changes, substitutions, and alterations may be made hereto without departing from the spirit and scope of the present invention. For example, although example embodiments have been described with reference to a number of elements included within the conferencing system 60, these elements may be combined, rearranged or positioned in order to accommodate particular routing architectures or needs. In addition, any of these elements may be provided as separate external components to the conferencing system 60, or each other where appropriate. In an example embodiment, a new state of resources in a conferencing system is provided, namely, a reserved but not currently used state. Further, a new class of provisional users may be defined which are allowed to borrow reserved resources and use them temporarily until they are actually required by a reservation holder.

Example embodiments can be used to simultaneously support ad hoc and reservation based usage with predictable behavior under heavy load. It will be appreciated that it may be possible to auto-extend conferences indefinitely.

Figure 5:
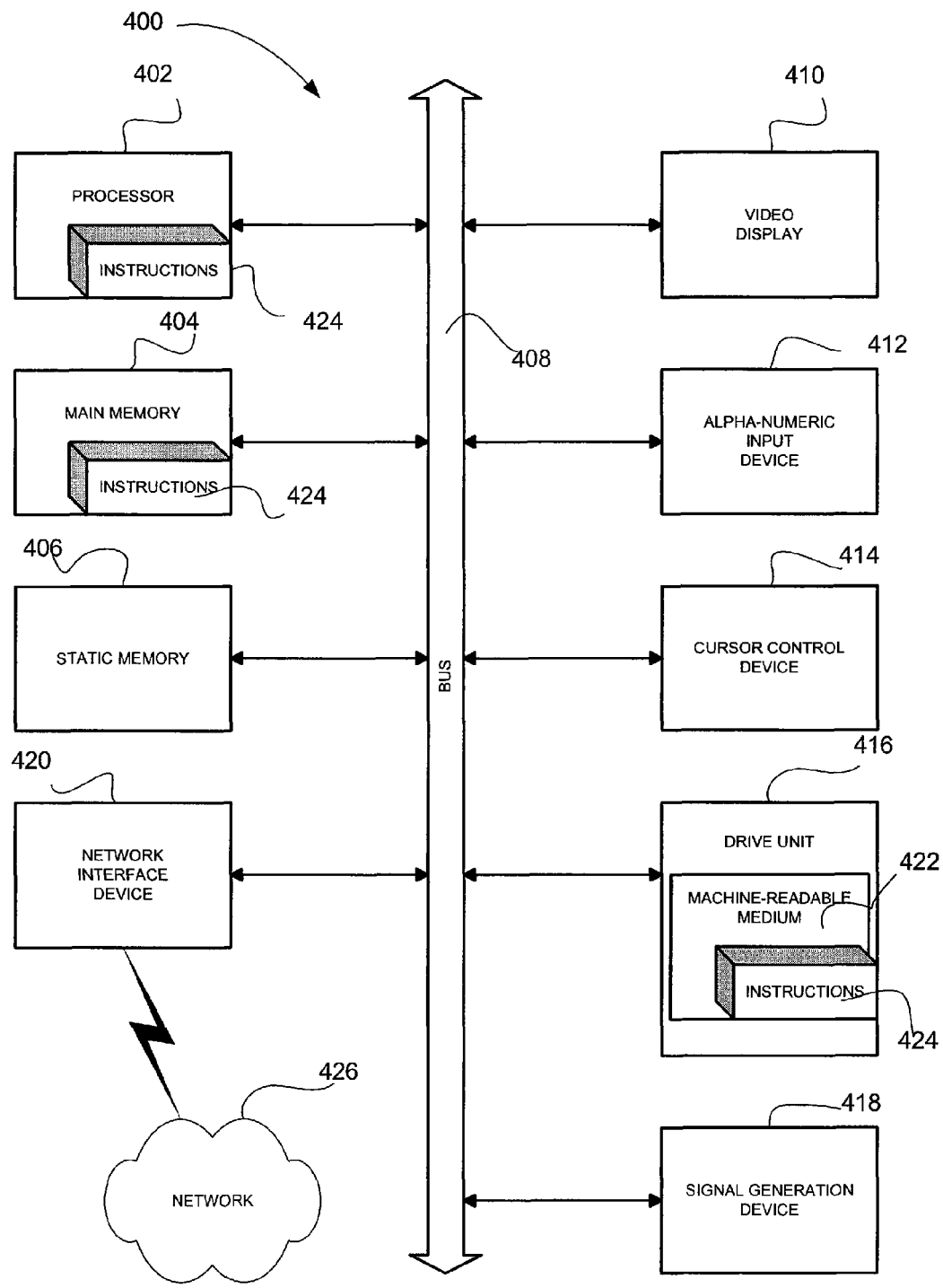
FIG. 5 shows a diagrammatic representation of machine in the example form of a computer system within which a set of instructions, for causing the machine to perform any one or more of the methodologies discussed herein.

FIG. 5 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., FTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. The method of disclosure is not to be interpreted as reflecting an intention that the claimed embodiments require more features than are expressly recited in each claim. Rather, as the following claims reflect, inventive subject matter lies in less features than a single disclosed embodiment. Thus the following claims are hereby incorporated into the Detailed Description, with each claim standing on its own as a separate embodiment.

What is claimed is:

1. A method of assigning resources from a pool of conferences resources provided by a conference system, the method comprising:

reserving at least some of the pool of conference resources for guaranteed status participants to a conference having an allocated number of resources allocated to the conference, to enable the guaranteed status participants to participate in the conference, the guaranteed resources comprising at least one of a communication port, an interface, and a media termination port;

during the conference, automatically assigning conference resources to a plurality of participants as the participants join the conference;

receiving at least one other participant to the conference and assigning a provisional status to the at least one other participant;

allocating unused resources in the pool of conference resources as provisional resources, the provisional resources comprising at least one of a communication port, an interface, and a media termination port;

admitting the at least one provisional status participant to participate in the conference utilizing the provisional resources; and if a number of assigned conference resources exceeds the allocated number of resources, modifying at least one assigned resource.

2. The method of claim 1, wherein at least one assigned resource is a borrowed resource for a further participant, the borrowed resource being a resource not allocated to the conference; and modifying the at least one assigned resource comprises associating a revocable status with the borrowed resource to identify the borrowed resource as being revocable when required by a conference to which it was allocated.

3. The method of claim 1, wherein modifying the at least one assigned resource comprises allocating a lower bandwidth service to at least one participant to accommodate a further participant, or terminating participation of at least one participant.

4. The method of claim 3, wherein allocating the lower bandwidth service comprises modifying a video service to an audio service, modifying an audio service to a chat service.

5. The method of claim 1, wherein the provisional resources are unreserved.

6. The method of claim 1, wherein the provisional resources are reserved.

7. The method of claim 6, wherein the provisional resources are reserved for the conference.

8. The method of claim 6, wherein the provisional resources are reserved for a further conference to be hosted by the system.

9. The method of claim 7, wherein at least part of the provisional resources are revocable during the conference.

10. The method of claim 9, comprising advising the at least one provisional status participant that at least part of the provisional resources are revocable during the conference.

11. The method of claim 7, comprising, during the conference, revoking at least part of the provisional resources and allocating the revoked provisional resources to a guaranteed status participant to the conference, to enable the guaranteed status participant to participate in the conference.

12. The method of claim 8, comprising, during the conference, revoking at least part of the provisional resources and allocating the revoked resources to a guaranteed status participant of the further conference, to enable the guaranteed status participant to participate in the further conference.

13. The method of claim 1, wherein the provisional resources further comprise at least one of a digital signal processing (DSP) resource, a mixer, a multipoint control unit (MCU), a processor, a memory module, a management unit, or bandwidth.

14. The method of claim 1, comprising enabling any one of the guaranteed status participants to relinquish their guaranteed status.

15. The method of claim 14, comprising modifying the guaranteed status to the provisional status.

16. A system to allocate resources from a pool of conferences resources, the system comprising:
an interface to interface with a plurality of endpoints associated with a plurality of participants; and
one or more processors connected to the interface and configured to
reserve at least some of the pool of conference resources for guaranteed status participants to a conference having an allocated number of resources allocated to the conference, to enable the guaranteed status participants to participate in the conference, the guaranteed resources comprising at least one of a communication port, an interface, and a media termination port;
during the conference, automatically assign conference resources to a plurality of participants as each participant join the conference;
receive at least one other participant to the conference and assigning a provisional status to the at least one other participant;
allocate unused resources in the pool of conference resources as provisional resources, the provisional resources comprising at least one of a communication port, an interface, and a media termination port;
admit the at least one provisional status participant to participate in the conference utilizing the provisional resources; and
if a number of assigned conference resources exceeds the allocated number of resources, modify at least one assigned resource.

17. The system of claim 16, wherein the at least one assigned resource is a borrowed resource for a further participant, the borrowed resource being a resource not allocated to the conference and the one or more processors are configured to modify the at least one assigned resource to associate a revocable status with the borrowed resource to identify the borrowed resource as being revocable when required by a conference to which it was allocated.

18. The system of claim 16, wherein the one or more processors are configured to allocate a lower bandwidth service to at least one participant to accommodate a further participant, thereby to modify the at least one assigned resource.

19. The system of claim 18, wherein the one or more processors are configured to modify a video service to an audio service, modify an audio service to a chat service, or terminate participation of at least one participant.

20. The system of claim 16, wherein the provisional resources are unreserved.

21. The system of claim 16, wherein the provisional resources are reserved.

22. The system of claim 21, wherein the provisional resources are reserved for the conference.

23. The system of claim 21, wherein the provisional resources are reserved for a further conference to be hosted by the system.

24. The system of claim 22, wherein the one or more processors are configured to revoke at least part of the provisional resources during the conference.

25. The system of claim 24, wherein the one or more processors are configured to advise the at least one provisional status participant that at least part of the provisional resources are revocable during the conference.

26. The system of claim 22, wherein the one or more processors are configured, during the conference, to revoke at least part of the provisional resources and allocate the revoked provisional resources to a guaranteed status participant to the conference, to enable the guaranteed status participant to participate in the conference.

27. The system of claim 23, wherein the one or more processors are configured, during the conference, to revoke at least part of the provisional resources and allocate the revoked resources to a guaranteed status participant of the further conference, to enable the guaranteed status participant to participate in the further conference.

28. The system of claim 16, wherein the provisional resources further comprise at least one of of a digital signal processing (DSP) resource, a mixer, a multipoint control unit (MCU), a processor, a memory module, a management unit, or bandwidth.

29. The system of claim 16, wherein the one or more processors are configured to enable any one of the guaranteed status participants to relinquish their guaranteed status.

30. The system of claim 29, wherein the one or more processors are configured to modify the guaranteed status to the provisional status.

31. A system to allocate resources from a pool of conferences resources, the system comprising:
means for reserving at least some of the pool of conference resources for guaranteed status participants to a conference having an allocated number of resources allocated to the conference, to enable the guaranteed status participants to participate in the conference, the guaranteed resources comprising at least one of a communication port, an interface, and a media termination port;
means for automatically assigning conference resources to a plurality of participants as the participants join the conference;
means for receiving at least one other participant to the conference and assigning a provisional status to the at least one other participant;
means for allocating unused resources in the pool of conference resources as provisional resources, the provisional resources comprising at least one of a communication port, an interface, and a media termination port;
means for admitting the at least one provisional status participant to participate in the conference utilizing the provisional resources; and
means for modifying at least one assigned resource if a number of assigned conference resources exceeds the allocated number of resources.

* * * * *

UNITED STATES PATENT AND TRADEMARK OFFICE
CERTIFICATE OF CORRECTION

PATENT NO. : 8,311,197 B2
APPLICATION NO. : 11/558799
DATED : November 13, 2012
INVENTOR(S) : Shaffer et al.

Page 1 of 1

It is certified that error appears in the above-identified patent and that said Letters Patent is hereby corrected as shown below:

In the Claims:

In column 16, line 21, in Claim 2, after "and", insert --¶--, therefor

In column 18, line 21, in Claim 28, after "one", delete "of", therefor

Signed and Sealed this
Second Day of July, 2013

Teresa Stanek Rea
*Acting Director of the United States Patent and Trademark Office*